US007715739B2

(12) United States Patent
Umeda et al.

(10) Patent No.: US 7,715,739 B2
(45) Date of Patent: May 11, 2010

(54) IMAGE FORMING APPARATUS WITH REFLECTIVE TYPE DETERMINATION UNIT TO DETERMINE A PREDETERMINED ATTRIBUTE OF THE RECORDING MATERIAL

(75) Inventors: Kengo Umeda, Numazu (JP); Tomoyuki Okada, Shizuoka-ken (JP); Satoshi Akiyama, Yokohama (JP); Osamu Koyama, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 11/091,626

(22) Filed: Mar. 29, 2005

(65) Prior Publication Data
US 2005/0264638 A1    Dec. 1, 2005

(30) Foreign Application Priority Data
Mar. 30, 2004  (JP)  ............................. 2004-101221
Mar. 15, 2005  (JP)  ............................. 2005-073784

(51) Int. Cl.
*G03G 15/00*  (2006.01)
(52) U.S. Cl. ........................... 399/45; 399/388; 399/389
(58) Field of Classification Search .................. 399/45, 399/388, 389
See application file for complete search history.

(56) References Cited

U.S. PATENT DOCUMENTS

| | | | |
|---|---|---|---|
| 5,291,256 A | 3/1994 | Kitajima et al. | ............. 355/290 |
| 5,676,363 A | 10/1997 | Kishida et al. | ........... 271/10.01 |
| 5,915,159 A | 6/1999 | Okada | ......................... 399/371 |
| 5,953,574 A | 9/1999 | Okada | ......................... 399/374 |
| 6,668,144 B2 | 12/2003 | Maruyama | ................... 399/45 |

(Continued)

FOREIGN PATENT DOCUMENTS

CN    1359034 A    7/2002

(Continued)

OTHER PUBLICATIONS

"Noise Sources in CMOS Image Sensors", Jan. 4, 1998, Hewlett-Packard Company, Imaging Products Operations.*

(Continued)

*Primary Examiner*—David M Gray
*Assistant Examiner*—Laura K Roth
(74) *Attorney, Agent, or Firm*—Fitzpatrick, Cella, Harper & Scinto

(57) ABSTRACT

An image forming apparatus has an image forming unit and a feeding unit for feeding a recording material at a predetermined speed to the image forming unit. A reflective type sensor reads irradiated light reflected off of the recording material and an image reading unit reads the light so as to obtain a surface image of the recording material so that a feed control unit can control the feeding of the recording medium so that a moving distance is shorter and in the case of feeding it at a predetermined speed while the recording material is read by the image reading unit. In the image forming apparatus a reflective type determination unit determines a predetermined attribute of the recording material using the surface image of the recording material read by the image reading unit so that the image forming apparatus can determine a kind of recording material based on the attribute obtain so as to form the image on the recording material.

4 Claims, 13 Drawing Sheets

U.S. PATENT DOCUMENTS

| | | | |
|---|---|---|---|
| 6,801,727 B2 | 10/2004 | Maruyama et al. | 399/45 |
| 7,130,573 B2 | 10/2006 | Nakamori | 399/389 |
| 2002/0071688 A1* | 6/2002 | Maruyama | 399/45 |
| 2003/0194251 A1 | 10/2003 | Maruyama et al. | 399/389 |
| 2004/0021266 A1 | 2/2004 | Mizuta et al. | 271/303 |
| 2005/0074248 A1 | 4/2005 | Akita et al. | 399/45 |

FOREIGN PATENT DOCUMENTS

| | | | |
|---|---|---|---|
| CN | 1452031 A | | 10/2003 |
| JP | 2001-225988 | | 8/2001 |
| JP | 2003-228256 | | 8/2003 |
| JP | 2003-302208 | | 10/2003 |
| JP | 2003302885 A | * | 10/2003 |
| KR | 2003-59561 | | 7/2003 |
| KR | 2003-14853 | | 10/2003 |

OTHER PUBLICATIONS

Korean Patent Office—"Official Notice of Rejection" issued in Korean Patent Application No. 10-2005-0026303.

Notification of First Office Action issued Nov. 16, 2007, by The State Intellectual Property Office of P.R. China in Chinese Application No. 2005100588353 (w/translation).

* cited by examiner

IMAGE FORMING APPARATUS WITH REFLECTIVE TYPE DETERMINATION UNIT TO DETERMINE A PREDETERMINED ATTRIBUTE OF THE RECORDING MATERIAL

BACKGROUND OF THE INVENTION

1. Field of the Invention

The present invention relates to an image forming apparatus and a method, and in particular, to a recording material determination apparatus and method for detecting reflected light from a surface of a recording material and determining a kind thereof, and an image forming apparatus and method using the recording material determination apparatus.

2. Description of the Related Art

An image forming apparatus such as a copying machine or a laser printer transfers an image visualized and developed by a development portion on a recording material and heats and pressurizes it under predetermined fixing conditions so as to fix a developed image. The predetermined fixing condition is significantly different depending on quality, thickness and surface treatment of the recording material. Therefore, a detailed setup according to a kind of recording material are required when using a plurality of kinds of recording material.

Conventionally, such an image forming apparatus has a size and a kind (kind of paper in the case where the recording material is paper) of recording material set up by a user on an operation panel provided on the image forming apparatus proper for instance so as to change the fixing conditions (fixing temperature and feeding speed of the recording material passing through a fixing apparatus for instance) according to that setup. Or else, there is a proposed method of having control means for setting it at a temperature lower than normal temperature and thereby solving adverse problems such as OHT twining on a fixing roller occurring in case of having an inkjet OHT (Over Head Transparency) other than prescribed paper mistakenly put through by the user and image degradation on a recording medium (refer to Japanese Patent Application Laid-Open No. 2003-228256 for instance).

There is also a known method, not limited to the OHT, of calculating depth of asperities and asperity intervals on a recording medium surface from a result of reading a surface image of the recording medium and determining the kind of recording medium such as gloss paper, plain paper, rough paper or OHT so as to optimally set image forming conditions including printing density, transfer bias setup, fixing temperature and process speed (refer to Japanese Patent Applications Laid-Open Nos. 2003-302208 and 2001-225988 for instance).

Such image reading apparatuses mostly have degradation of shot images due to variations in light volume caused by a light source or a lens. There are also variations in sensitivity in photoelectric cells of an image pickup device. For this reason, there is a thinkable method, for the sake of accurately reading an object and obtaining a correct imaging result, of shooting for measuring a shading amount a plurality of times in a state of having the recording medium moved and averaging shooting results thereof so as to automatically calculate the shading amount and correct the shooting results.

In the case of the above-mentioned image forming apparatus, however, it is necessary to shoot a plurality of times in the state of having the recording medium moved. For that reason, there is a problem that a sufficient area for having the recording medium moved must be secured in the image forming apparatus and so the apparatus becomes large.

SUMMARY OF THE INVENTION

The present invention has been made in view of such problems, and has an object to improve a conventional apparatus to provide an apparatus and method that can maintain an accuracy in determining of recording material without increasing the size of the apparatus. It determines a recording medium in a configuration using an image pickup device and a lens without being influenced by unevenness in detection distribution caused by a light source, a lens or the image pickup device. In this regard, an object of the present invention is to provide image forming apparatus and method which are simple and keep required accuracy without increasing size of the apparatus.

To attain this object, an image forming apparatus of the present invention comprises: feeding means for feeding a recording material at predetermined speed in a predetermined direction; image forming means for forming an image on the recording material fed by the feeding means; light irradiation means for irradiating light on the recording material; and image reading means for reading the light irradiated by the light irradiation means and reflected from a surface of the recording material and thereby obtaining the image on the surface of the recording material; and reflective type determination means, including the light irradiation means and the image reading means, for having the image on the surface of the recording material read by the image reading means while having the recording material fed by the feeding means so as to determine a predetermined attribute of the recording material by using obtained image on the surface of the recording material, wherein the apparatus determines a kind of recording material based on the attribute obtained by the reflective type determination means to form the image on the recording material, and the reflective type determination means includes feeding control means for, on having the recording material read by the image reading means, controlling the feeding means to render a moving distance shorter then than that in the case of feeding it at the predetermined speed.

Another image forming apparatus of the present invention comprises: feeding means for feeding a recording material at predetermined speed in a predetermined direction; a latent image supporting element for supporting a latent image; developing means for visualizing the latent image as a developed image by providing a developer to the latent image supporting element; transfer means for transferring the developed image of the developing means to the recording material fed by the feeding means; fixing means for fixing the recording material having the developed image transferred thereon by the transfer means; light irradiation means for irradiating light on the recording material; and image reading means for reading the light irradiated by the light irradiation means and reflected from a surface of the recording material and thereby obtaining the image on the surface of the recording material; and reflective type determination means, including the light irradiation means and the image reading means, for having the image on the surface of the recording material read by the image reading means while having the recording material fed by the feeding means so as to determine a predetermined attribute of the recording material by using obtained image on the surface of the recording material, wherein the apparatus determines a kind of recording material based on the attribute obtained by the reflective type determination means to form the developed image on the recording material under an image forming process condition corresponding to the determined kind, and the reflective type determination means includes feeding control means for, on having the recording material read by the image reading means, controlling the feeding means to render a moving distance shorter then than that in the case of feeding it at the predetermined speed.

Furthermore, an image forming method of the present invention comprises: a feeding step of feeding a recording material by feeding means at predetermined speed in a predetermined direction; a step of developing and fixing an image by developing and fixing means on the recording material fed by the feeding means; an image reading step of, while feeding the recording material by feeding means, reading by image reading means the light irradiated by light irradiation means for irradiating light on the recording material and reflected from a surface of the recording material and thereby obtaining the image on the surface of the recording material; a reflective type determination step, including the image reading step, of performing the image reading step so as to determine a predetermined attribute of the recording material by reflective type determination means by using obtained image on the surface of the recording material; and a step of determining a kind of the recording material based on an obtained attribute, wherein the reflective type determination step includes a step of, on having the recording material read by the image reading means, having the feeding means controlled by feeding control means to render a moving distance shorter then than that in the case of feeding it at the predetermined speed.

A recording material determination apparatus of the present invention comprises: an image reading portion for irradiating light on a recording medium and reading light reflected from a surface of the recording medium and thereby obtaining an image on the surface of the recording medium; a feeding portion for feeding the recording medium at a predetermined speed; a feeding control portion for, on having the image on the recording medium read by the image reading portion, controlling the feeding portion to feed the recording medium in a different feeding state from the feeding state in the case of feeding it at the predetermined speed; and a determination portion for having the image on the surface of the recording medium read by the image reading portion while having the recording medium fed in the different feeding state by the feeding portion so as to determine an attribute of the recording medium by using obtained images on the surface of the recording medium.

A recording material determination method of the present invention comprises: a feeding step of feeding a recording medium at a predetermined speed; an image reading step of irradiating light on the recording medium and reading the light irradiated and reflected from a surface of the recording medium and thereby obtaining an image on the surface of the recording medium; a feeding control step of, in the image reading step, controlling the feeding operation of the recording medium to feed the recording medium in a different feeding state from the feeding state in the case of feeding it at the predetermined speed; and a determination step of having the image on the surface of the recording medium read, while feeding the recording medium in a different feeding state from the feeding state in the case of feeding it at the predetermined speed in the image reading step so as to determine an attribute of the recording medium by using obtained image on the surface of the recording medium.

An image forming apparatus comprising: a feeding portion for feeding the recording medium at a predetermined speed; an image forming portion for forming an image on the recording material fed by the feeding portion; an reading portion for irradiating light on a recording medium and reading light reflected from a surface of the recording medium and thereby obtaining an image on the surface of the recording medium; a control portion for having the image on the surface of the recording medium read by the reading portion while having the recording medium fed in a different feeding state by the feeding portion so as to change an image forming condition of the image forming portion by using obtained images on the surface of the recording medium.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
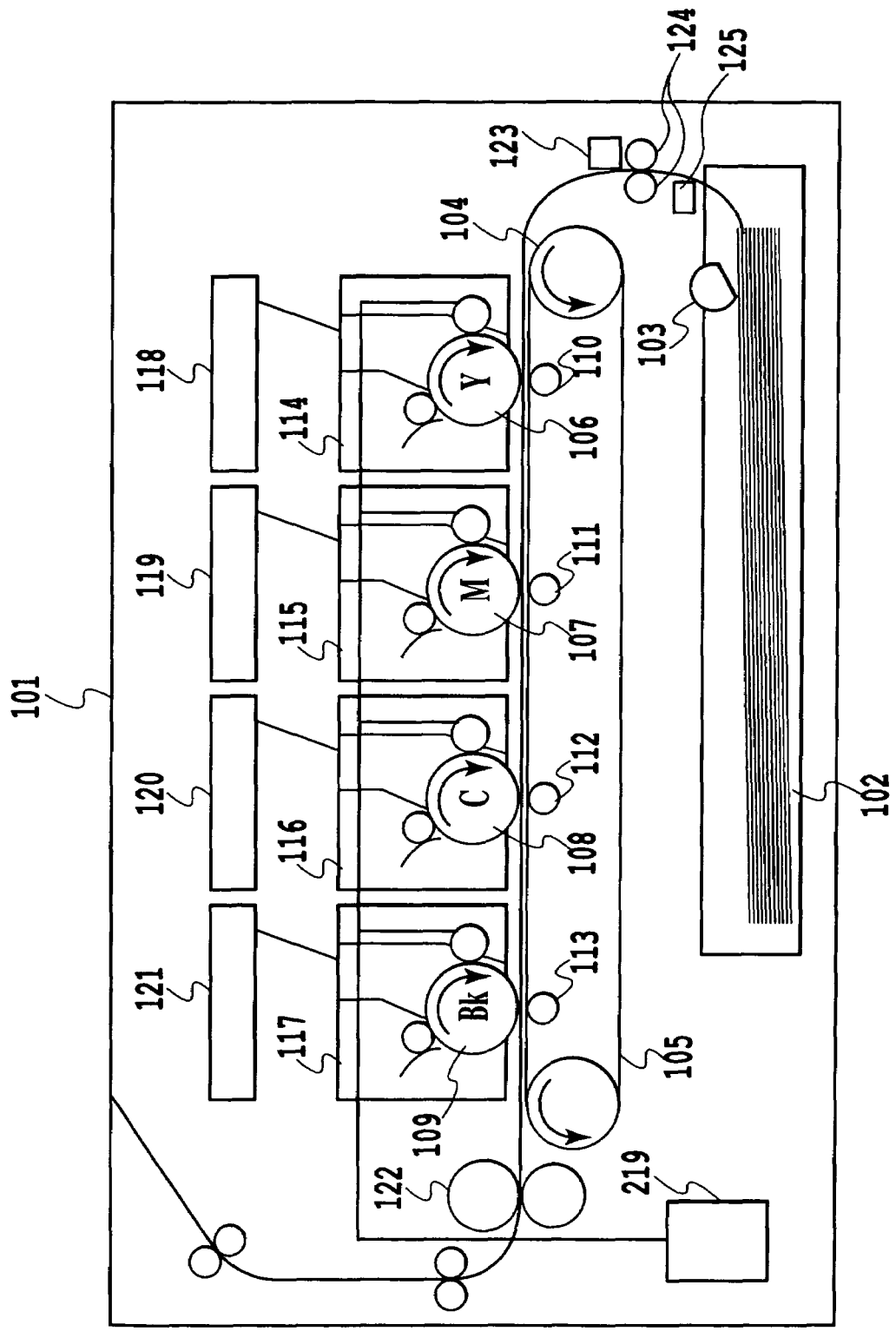
FIG. 1 is a schematic view showing an image forming apparatus used in a first embodiment of the present invention.

Hereunder, an image forming apparatus and a method according to the present invention will be described by referring to the drawings.

The present invention is used in a general image forming apparatus as shown in FIG. 1. In FIG. 1, an image forming apparatus 101 comprises a paper cassette 102, a paper feed roller 103, a feeding roller 124, a top sensor 125, a transfer belt driving roller 104, a transfer belt 105, yellow, magenta, cyan and black photoconductive drums 106 to 109, transfer rollers for the colors 110 to 113, yellow, magenta, cyan and black cartridges 114 to 117, yellow, magenta, cyan and black optical units 118 to 121 and a fixing unit 122.

The image forming apparatus 101 comprises as image forming means, an optical unit, a photosensitive drum, the transfer belt 105, and the fixing unit 122, and generally uses an electrophotographic process to transfer yellow, magenta, cyan and black images one upon another on a recording material, and controls temperature of a toner image transferred by the fixing unit 122 including fixing rollers so as to thermally fix it. The optical units 118 to 121 in the colors are configured to form a latent image by performing an exposure scan on surfaces of the photoconductive drums 106 to 109 with a laser beam. These series of image forming operations are synchronized to have the images transferred from a predetermined position on the recording material to be fed.

Furthermore, the image forming apparatus 101 comprises a paper feed motor for supplying and feeding recording paper as the recording material, and the fed recording paper has a desired image formed on its surface while being fed to the transfer belt and fixing roller.

Supplied recording paper is fed by a feeding roller 124 at a preset speed. The front edge of the recording paper is detected by the top sensor 125, and when a predetermined time has passed after the detection, the feeding operation for the recording paper is temporally stopped. In this temporal stopped state, the surface image of the recording paper is read by the sensor unit 123. Imaging is performed for the shading measurement mentioned above multiple times before the temporal stop.

A sensor unit 123 is placed before the recording paper is fed to the transfer belt, and irradiates light on the surface of the fed recording material to focus reflected light thereof and form an image so as to read the image in a specific area on the surface of the recording material.

Figure 2:
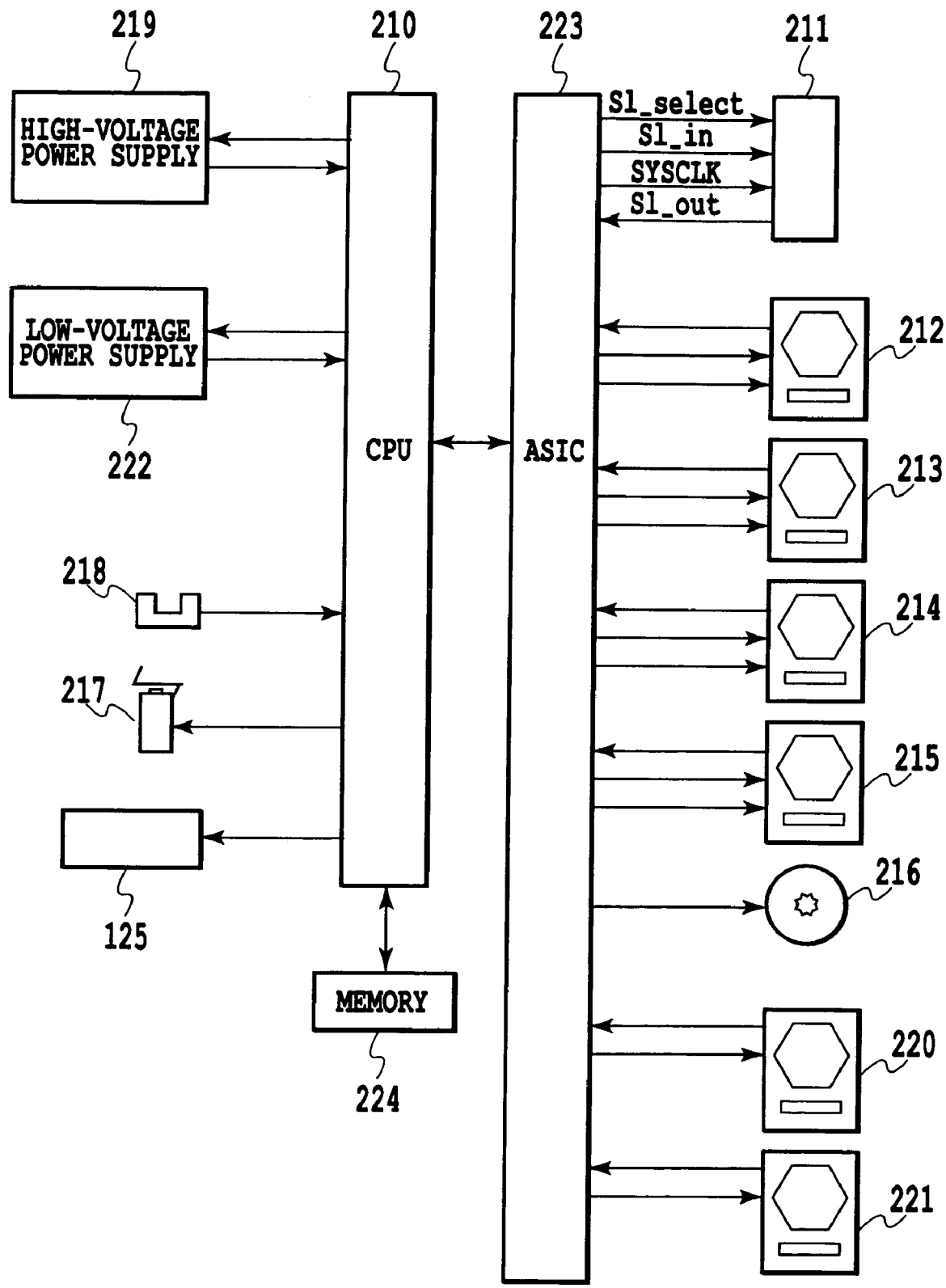
FIG. 2 is a diagram showing a configuration of each unit controlled by a control CPU according to an embodiment of the present invention.

A control CPU 210 as control means of the image forming apparatus 101 will be described below by referring to FIG. 2. The control CPU 210 provides a desired amount of heat to the recording material by means of the fixing unit 122 so as to fusion-bond and fix the toner image on the recording material.

Next, a description will be given by using FIG. 2 as to the operation of the control CPU of the image forming apparatus and method according to an embodiment of the present invention. FIG. 2 is a diagram showing a configuration of each unit controlled by the control CPU 210. In FIG. 2, the control CPU 210 is connected to a CMOS sensor 211 and the optical units for the colors 212 to 215 including polygon mirrors, motors and lasers, and controls the optical units for the colors in order to scan a laser on the surfaces of the photoconductive drums and draw a desired latent image. Likewise, the control CPU 210 controls a paper feed motor 216 for feeding the recording material, a paper feed solenoid 217 used to start driving the paper feed roller for feeding the recording material, a paper existence sensor 218 for detecting whether or not the recording material is set at a predetermined position, a high-voltage power supply 219 for controlling primary charging, development, primary transfer and secondary transfer biases necessary for the electrophotographic process, a drum driving motor 220 for driving the photoconductive drums and transfer rollers, a belt driving motor 221 for driving the rollers of the transfer belt and fixing unit, the fixing unit and a low-voltage power supply unit 222. Furthermore, the control CPU 210 monitors the temperature with a thermistor (not shown) so as to exert control to keep fixing temperature constant.

The control CPU 210 is also connected to a memory 224 by a bus and so on (not shown), and the memory 224 stores programs and data for executing all or a part of the processes performed by the control CPU 210 in the above control and the embodiments described herein. To be more specific, the control CPU 210 performs the operations of the embodiments of the present invention by using the programs and data stored in the memory 224.

The ASIC 223 is a hardware circuit that controls motor speed inside the CMOS sensor 211 and optical units 212 to 215 and also controls speed of the paper feed motor based on an instruction of the control CPU 210. As for speed control of the motors, it detects a tack signal from the motor (not shown) and exerts the speed control by outputting an acceleration signal or a deceleration signal to the motor so that an interval of the tack signal becomes a predetermined time. Since speed control is performed for multiple motors, it is more advantageous to construct the control circuit from a hardware circuit of ASIC 223 than using software control, so as to reduce a control load of the control CPU 210.

On receiving a print command of an instruction from a host computer (not shown), the control CPU 210 determines whether or not the recording material exists by means of the paper existence sensor 218. If the paper exists, the control CPU 210 drives the paper feed motor 216, drum driving motor 220 and belt driving motor 221, and also drives the paper feed solenoid 217 to feed the recording material to the predetermined position.

If the recording material is fed to the position of the CMOS sensor 211 after a predetermined time passed from the detection of the front edge of the recording paper by the top sensor 125, the control CPU 210 provides a CMOS sensor 211 imaging instruction to the ASIC 223 so that the CMOS sensor 211 images a surface image of the recording material. In this case, the ASIC 223 activates Sl_select and then outputs SYSCLK of a predetermined pulse in predetermined timing so as to capture imaging data outputted from the CMOS sensor 211 via Sl_out.

As for gain setting of the CMOS sensor 211, it sets a value determined in advance by the control CPU 210 on a register inside the ASIC 223 so that the ASIC 223 activates Sl_select and then outputs SYSCLK of the predetermined pulse in predetermined timing to set a gain of the CMOS sensor 211 via Sl_in.

The ASIC 223 comprises a control circuit 702 for implementing a recording material determination apparatus and a method thereof of the present invention described below, and a result of calculation for determining an attribute of the recording material is stored in a register A and a register B inside the control circuit 702. And the control CPU 210 reads the calculation result for determining the attribute of the recording material stored in the register A and register B inside the control circuit 702, and determines the kind of the supplied recording material so as to exert control to change image forming conditions according to the result.

The following can be named as various kinds of control of the image forming conditions executed by the control CPU 210. For instance, in the case of so-called rough paper wherein surface texture of the recording material is rough, the control is exerted to render a development bias lower than that of plain paper and curb a toner amount adhering to the surface of the recording material so as to prevent the toner from spattering. This is intended to solve the problem that, especially in the case of the rough paper, the toner spatters due to paper texture and degrades image quality because of a large toner amount adhering to the surface of the recording material.

The control CPU 210 also determines the kind of the supplied recording material, and variably controls a temperature condition of a fixing unit 22 according to the result. This is effective, in the case of the OHT in particular, as to the problem that transparency of the OHT degrades if fixability of the toner adhering to the surface of the recording material is bad.

Furthermore, the control CPU 210 also determines the kind of the supplied recording material, and variably controls feeding speed of the recording material according to the result. The feeding speed is controlled by having a speed control register value of the ASIC 223 for exerting the speed control set by the control CPU 210. For instance, in the case of a transparent recording material such as the OHT, a fixing temperature condition is changed, and the control is exerted to increase the fixing temperature in order to increase the transparency. It is also possible to exert the control to change the feeding speed of the recording material depending on whether or not the kind of the recording material is a transparent type. Furthermore, in the case of the gloss paper, it is possible to increase the fixability of the toner adhering to the surface of the recording material so as to improve the gloss and enhance the image quality.

Thus, according to this embodiment, the calculation is performed by a hardware circuit by the ASIC from the surface image of the recording material imaged by the CMOS sensor. From the result of the calculation, the CPU can exert the control to change a development bias condition of the high-voltage power supply, the fixing temperature of the fixing unit or the feeding speed of the recording material.

First Embodiment

Figure 3:
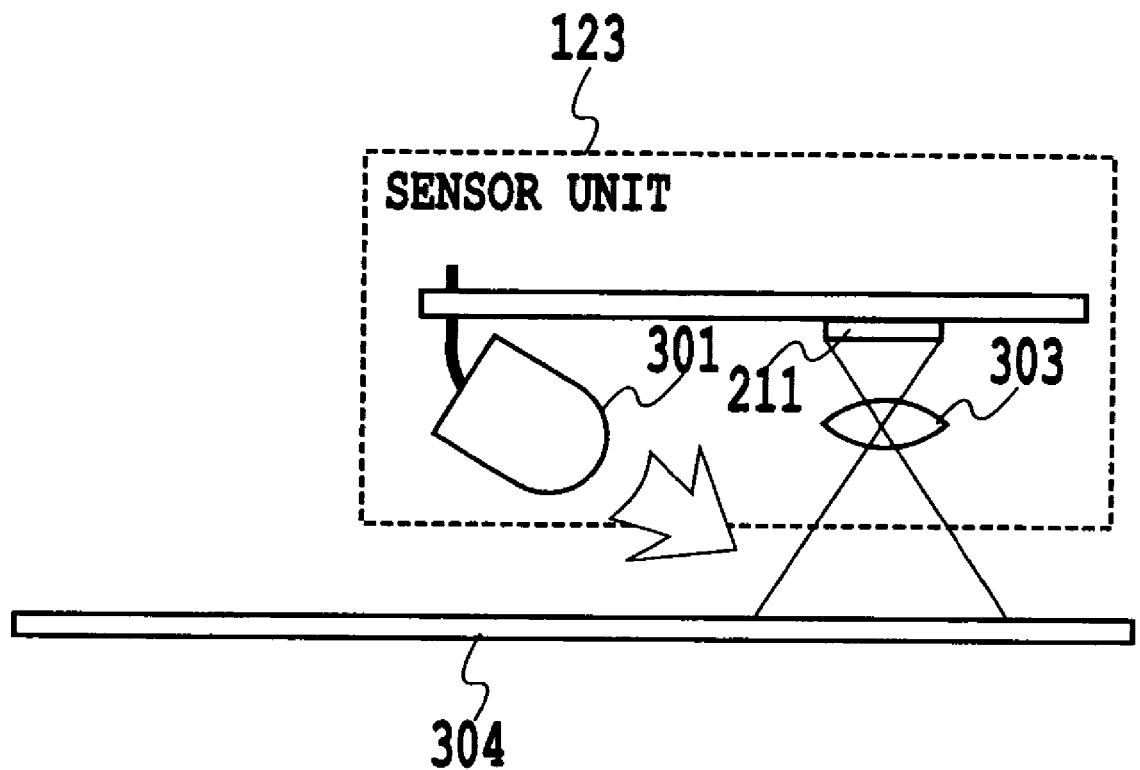
FIG. 3 is a pattern diagram showing an overview configuration for detecting a reflected light volume of a recording material.

Next, a description will be given as to the recording material determination apparatus according to an embodiment of the present invention. FIG. 3 is a pattern diagram showing an overview configuration for detecting a reflected light volume of the recording material.

As shown in FIG. 3, the sensor unit 123 comprises a reflection LED 301 which is light irradiation means, a recording material 304, the CMOS sensor 211 which is reading means and an imaging lens 303. Here, the CMOS sensor 211 may be a CCD sensor.

The light of which light source is the reflection LED 301 is irradiated toward the surface of the recording material 304. The light source is the LED according to this embodiment. However, it is also possible to use a xenon tube or a halogen lamp. The reflected light from the recording material 304 is focused via the imaging lens 303 to be imaged on the CMOS sensor 211. It is thereby possible to read the image on the surface of the recording material 304.

According to this embodiment, the reflection LED 301 is placed to obliquely irradiate LED light on the surface of the recording material 304 at a predetermined angle as shown in FIG. 3. However, it is also possible, instead of obliquely mounting the LED, to obliquely irradiate the light with a light guide not shown.

Figure 4:
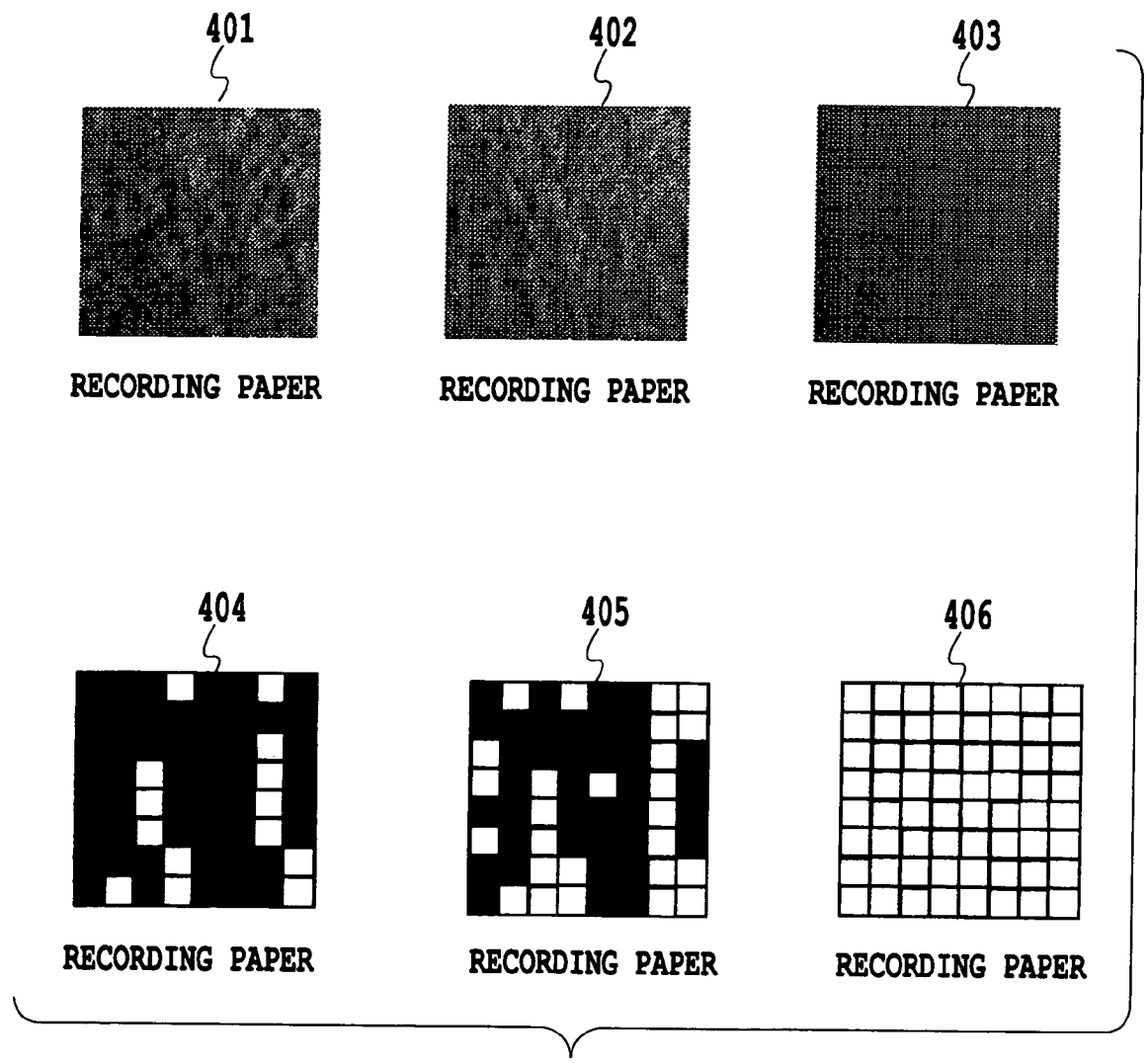
FIG. 4 is a diagram showing a contrast between an analog image on a surface of the recording material read by a CMOS sensor of an image reading sensor according to an embodiment of the present invention and a digital image having digitally processed an output from the CMOS sensor to 8×8 pixels.

FIG. 4 is a diagram showing a contrast between an analog image on the surface of the recording material 304 read by the CMOS sensor 211 of the sensor unit 123 and a digital image having digitally processed an output from the CMOS sensor 211 to 8×8 pixels. Here, digital processing is performed by converting an analog output from the CMOS sensor 211 to 8-bit pixel data by A/D conversion.

In FIG. 4, a recording material A401 is so-called rough paper of which paper texture on the surface is relatively rough, a recording material B402 is so-called plain paper generally used, and a recording material C403 is so-called gloss paper, where enlarged surface images thereof are shown respectively. These images 401 to 403 read by the CMOS sensor 211 are digitally processed to become images 404 to 406 shown in FIG. 4 respectively. Thus, the images on the surface are different depending on the kind of recording material. This is a phenomenon occurring mainly due to different states of the texture on the surface of the paper.

Apart from this, a reflected light volume of the recording material is generally calculated from a total or an average of the light inputted to the respective pixels. It is also possible, however, to use the result of only one light-receiving pixel depending on the embodiment.

As described above, it is possible to identify a surface state of the paper texture of the recording material from the image which is a digitally processed image of the result of reading the surface of the recording material with the CMOS sensor 211. In addition, it is possible to determine the recording material by the reflected light volume.

To identify the surface of the recording material, a part of the surface of the recording material is read as the digital image comprised of 8×8 pixels, and a pixel density Dmax as a maximum density and a pixel density Dmin as a minimum density per line in a direction orthogonal to a feeding direction of the recording material in the image are detected so as to obtain Dmax−Dmin, which is given from each line, for eight lines. And a quality of material (smoothness) as the attribute of the recording material can be determined by the value of Dmax−Dmin obtained by averaging.

To be more specific, in the case where the paper texture on the surface is rough as in the case of the recording material A, a large number of shadows of the texture are generated. Consequently, differences between bright locations and dark locations become significant so that Dmax−Dmin becomes larger. In the case of the image on the surface of the recording material, such as the recording material C, of which texture is sufficiently compressed and smoothness is high, there are a smaller number of shadows of the texture so that Dmax−Dmin becomes smaller. The quality of the recording material is determined by this comparison, which is a part of information for determining the kind.

The image data may be binarized to obtain edge number data for each line thereby determining the surface unevenness. The edge number data may be, for example, obtained by assigning "1" to white portion and "0" to black portion and counting the number of "1" data portion in each line.

The surface state of the recording paper can be recognized using the value of Dmax−Dmin and the edge number data.

Thus, the images obtained by irradiating the light on the surface of the recording material are different depending on the kind of the recording paper. This is a phenomenon arising mainly because the state of the texture on the surface of the paper and the state of compression of the texture of the paper are different.

The above-mentioned control processor is required to perform a sampling process of the images from the CMOS sensor 211 and gain and filter calculation processes in real time. Therefore, it is desirable to use a digital signal processor.

Figure 7:
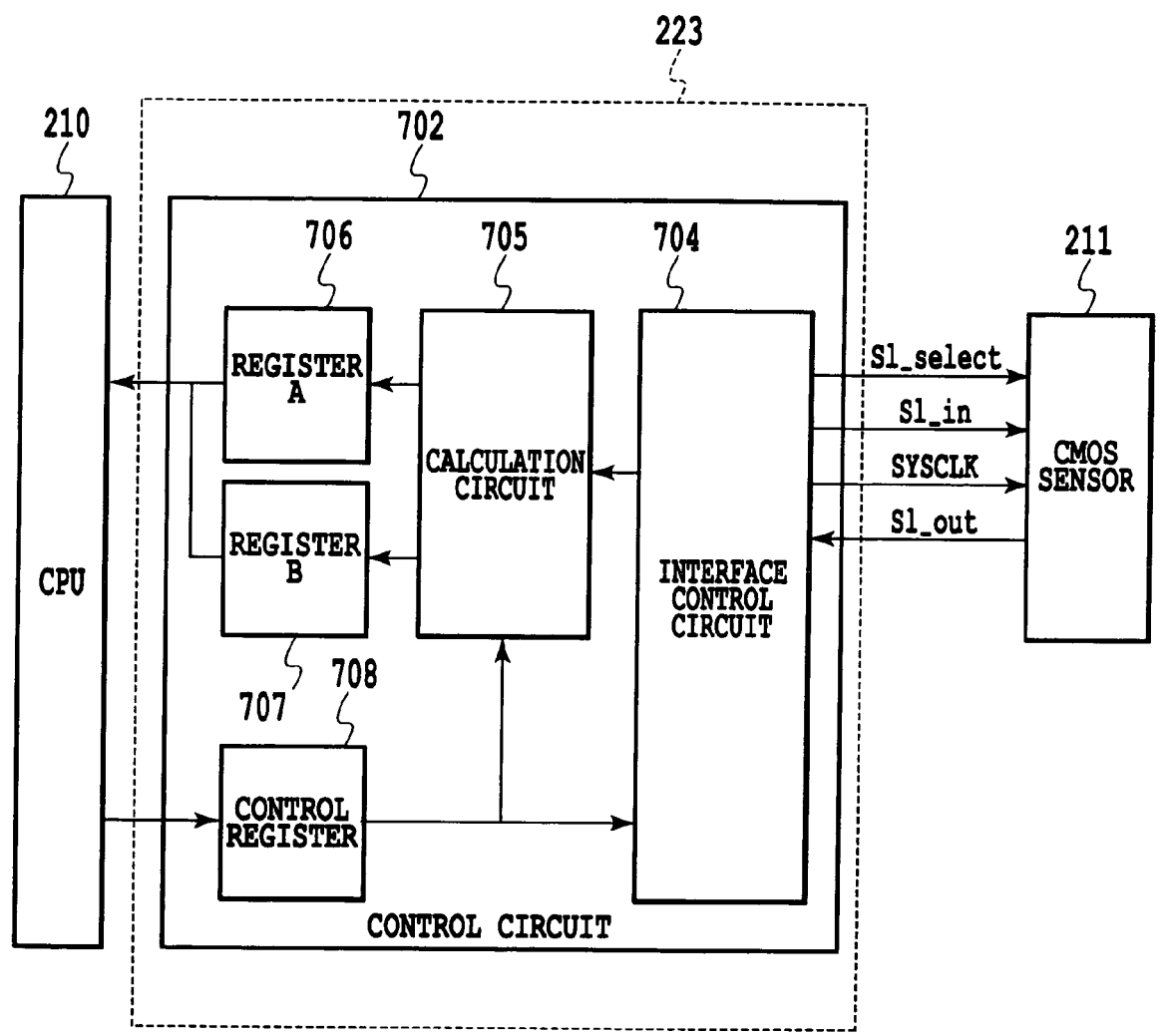
FIG. 7 is a block diagram showing a control circuit of the CMOS sensor.

Next, the control circuit of the CMOS sensor 211 will be described by using FIG. 7. FIG. 7 is a block diagram showing the control circuit of the CMOS sensor 211. In FIG. 7, the control CPU 210 as a determination portion comprises the control circuit 702, the CMOS sensor 211, an interface control circuit 704, a calculation circuit 705, a register A706, a register B707 and a control register 708.

Next, the operation will be described. The control CPU 210 provides data indicating an operation instruction of the CMOS sensor 211 to the control register 708, and then the CMOS sensor 211 starts imaging the image on the surface of the recording material. To be more specific, accumulation of electric charges on the CMOS sensor 211 is started. The CMOS sensor 211 is selected by Sl_select from the interface control circuit 704 and SYSCLK is generated in predetermined timing so that imaged digital image data is sent from the CMOS sensor 211 via the Sl_out signal.

The imaging data received via the interface control circuit 704 is calculated by the control circuit 702, and the result of the calculation is stored in the registers A706 and B707. The control CPU 210 determines the attribute of the recording material from the values of the two registers.

The imaging data received via the interface control circuit 704 is subject to a predetermined calculation by the calculation circuit of the control circuit 702, and, as the result, a value is stored into the register A 706, which value is the average of values of Dmax–Dmin for eight lines, which is the difference data between the density Dmax of the pixel with a maximum density and the density Dmin of the pixel with a minimum density on the surface of the recording paper.

The imaging data received via the interface control circuit 704 is subject to a predetermined calculation by the calculation circuit of the control circuit 702, and the calculation result is stored into the register B 707 as edge number data of the recording paper surface (total value of the edge number for lines, for example). CPU 701 determines the evenness of the recording material, that is an attributes of the recording material, from the above two values of the registers.

Figure 6:
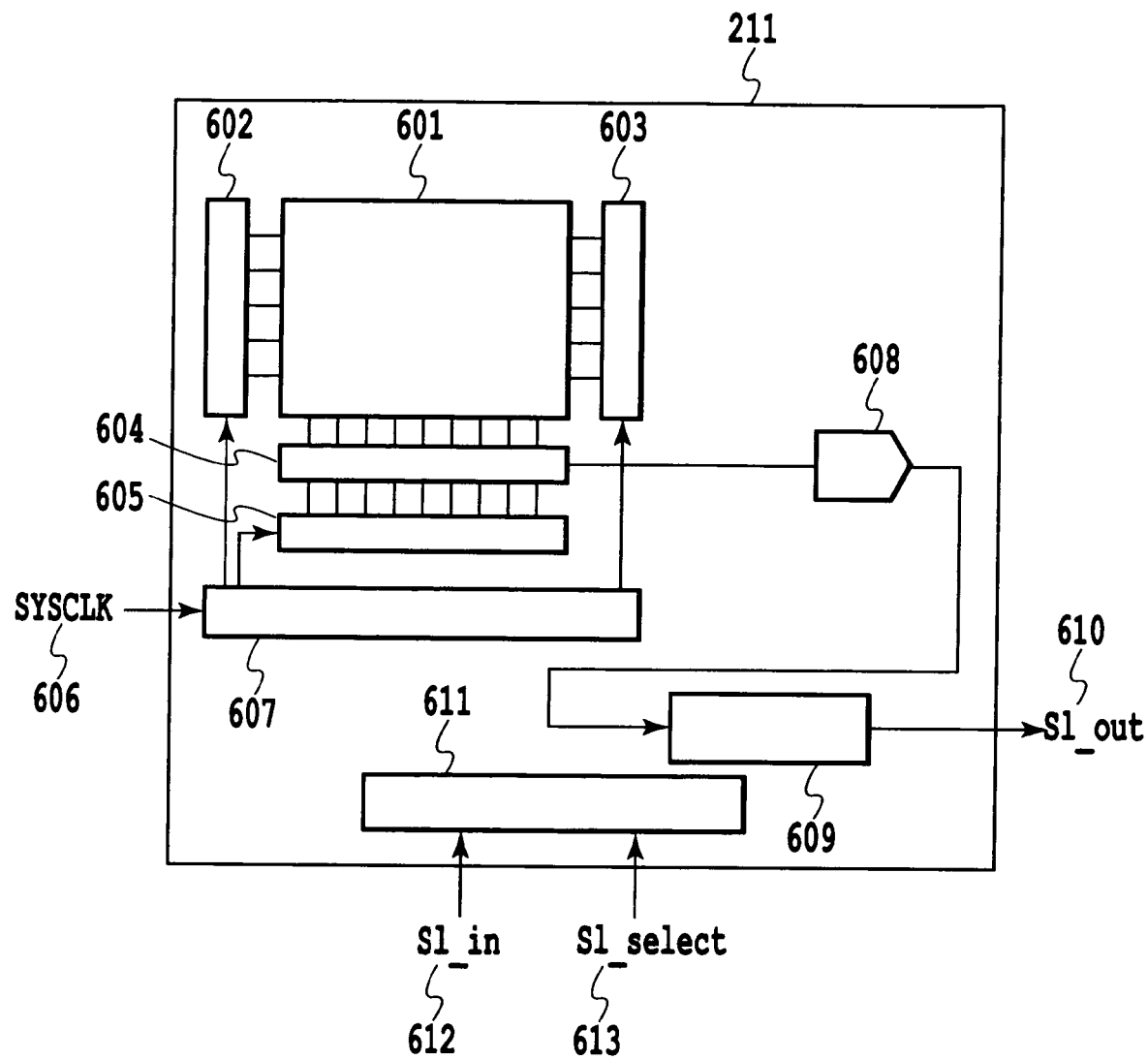
FIG. 6 is a diagram showing a circuit block diagram of the CMOS sensor.

Next, a sensor circuit block diagram will be described by using FIG. 6. FIG. 6 is a diagram showing a circuit block diagram of the CMOS sensor. In FIG. 6, a CMOS sensor portion 601 has a sensor equivalent to 8×8 pixels placed like an area therein. Furthermore, vertical shift registers 602 and 603, an output buffer 604, a horizontal shift register 605, a system clock 606 and a timing generator 607 are placed in addition.

Next, the operation will be described. On activating a Sl_select signal 613, the CMOS sensor portion 601 starts the accumulation of electric charges based on received light. Next, when the system clock 606 is given, the vertical shift registers 602 and 603 sequentially select rows to be read by means of the timing generator 607 so as to sequentially set the data to the output buffer 604.

The data set to the output buffer 604 is transferred to an A/D converter 608 by the horizontal shift register 605. The pixel data digitized by the A/D converter 608 is controlled in predetermined timing by an output interface circuit 609, and is outputted to an Sl_out signal 610 during a period when the Sl_select signal 613 is active.

Figure 8:
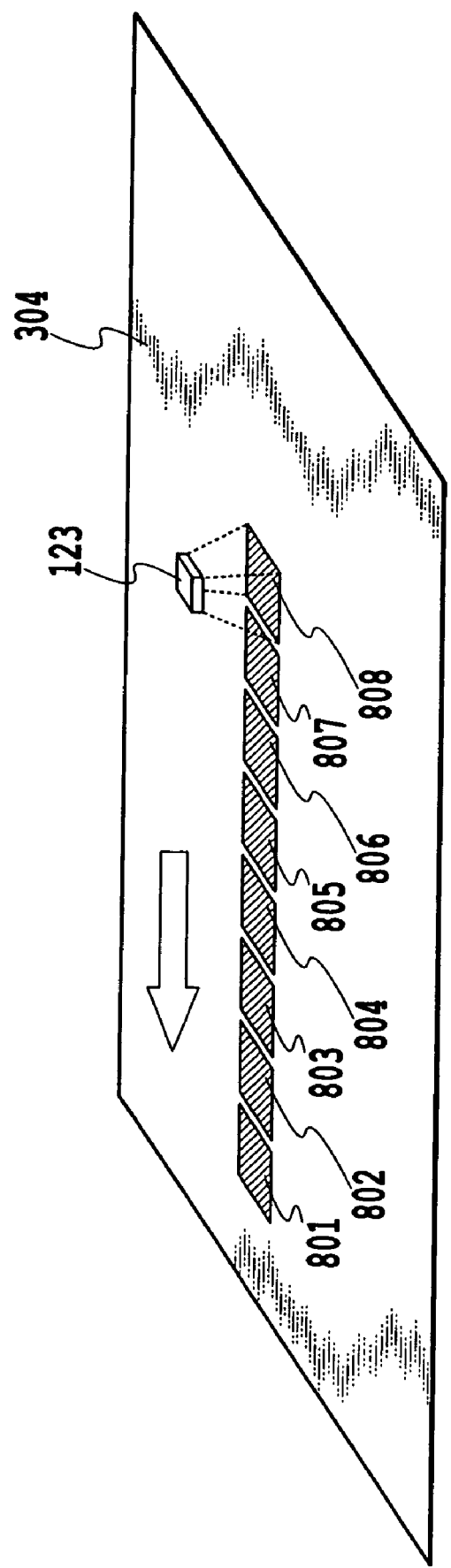
FIG. 8 is a diagram schematically showing a measurement area for performing shading measurement obtained by being irradiated by an irradiation apparatus of a conventional sensor portion.
Figure 9:
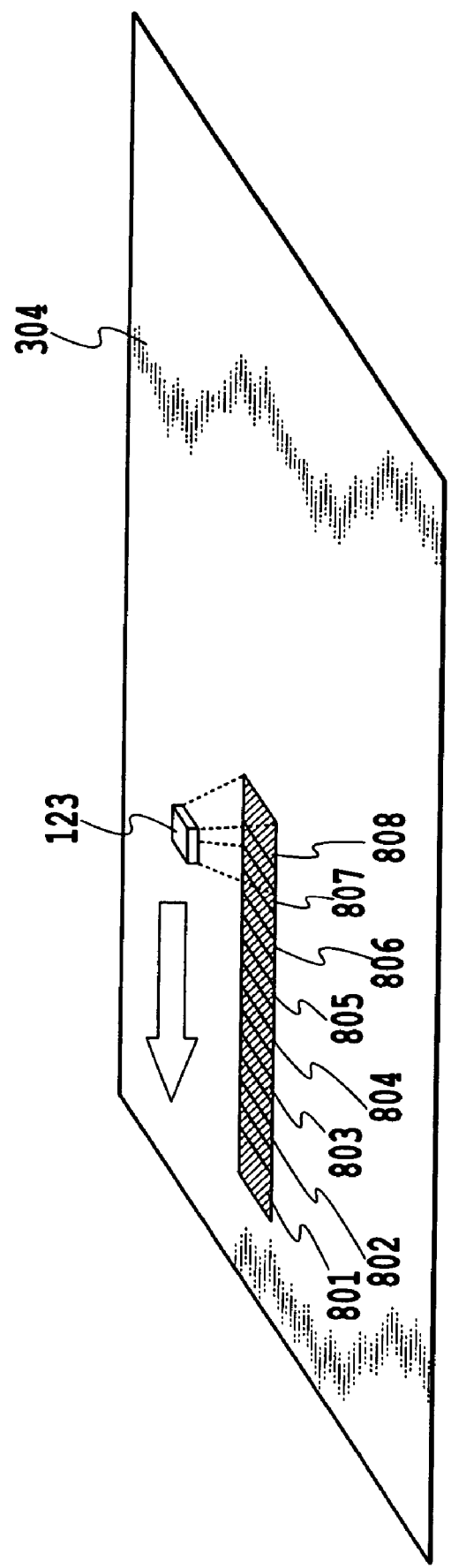
FIG. 9 is a diagram schematically showing the measurement area for performing the shading measurement obtained by being irradiated by the irradiation apparatus of the sensor portion according to an embodiment of the present invention.

A description will be given as to the operation of an embodiment for implementing the present invention by using the above sensors, control circuits and so on. Reference numerals 801 to 808 of FIG. 8 schematically show measurement areas for performing shading data measurement obtained by being irradiated by an irradiation apparatus of a conventional sensor portion. Likewise, reference numerals 901 to 908 of FIG. 9 schematically show the measurement areas for performing the shading data measurement obtained by being irradiated by the irradiation apparatus of the sensor portion according to an embodiment of the present invention.

First, a description will be given as to a principle of elimination of image reading noise used in this embodiment. To simplify the description, by way of example, the case of shooting an image such as (9) of FIG. 10 will be considered assuming the case of shooting with the CMOS sensor of 64 pixels of 8×8 pixels a page. The image of (9) includes a character "A" of a target shooting image and shading components of an optical system and an illumination system together. First, eight images for calibrating are shot while a shooting object is fed and moving. The shot images are (1) to (8) of FIG. 10. It is necessary to average the images for calibrating because they include noise components due to dust sticking to a detected object and irradiation unevenness of the irradiation apparatus which are nontarget information. To be more specific, it is possible, by means of averaging, to calculate unchanged components (such as the shading components and variations in pixel sensitivity) which are the image reading noise data even though the shooting object changes.

Figure 10:
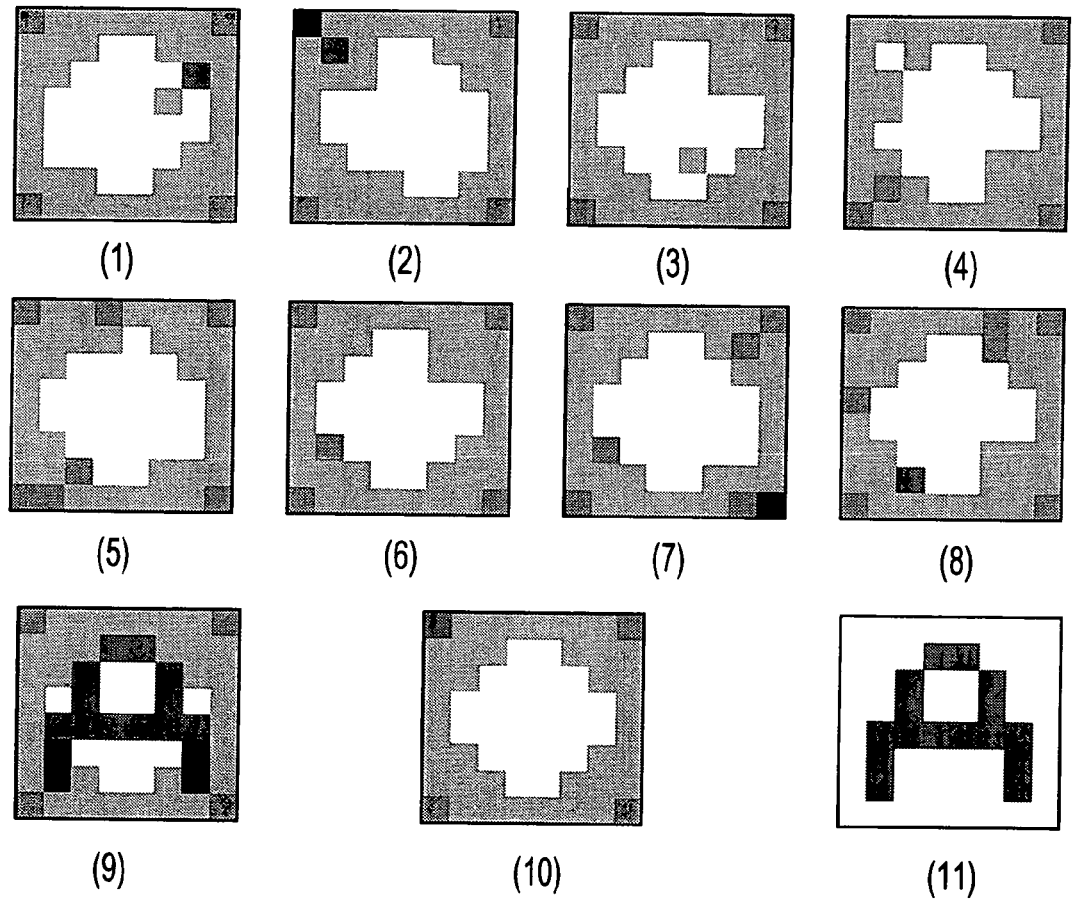
FIGS. 10 are diagrams showing images obtained by irradiating light on the recording material.

(10) of FIG. 10 shows the image data after the averaging. A desired image is shot after performing the shooting and averaging as above. In this case, images for correction may be shot after performing the target shooting. As the result of shooting the desired image is the image (9) of FIG. 10, it is possible to make a correction thereto with an averaged image (10) having only the shading components calculated so as to eliminate the shading components. Thus, the character "A" which is a desired shooting image can be obtained more clearly. (11) of FIG. 10 shows the image obtained by thus making a correction.

According to this embodiment, this principle is used to obtain a more accurate image on the surface of the recording material so as to determine a characteristic of the recording material, such as the rough paper with a rough surface or the gloss paper with a fine surface. To be more precise, shading data, which is the image reading noise data generated due to the unevenness of irradiation of the irradiation apparatus and so on, is calculated first from a plurality of images obtained by shooting the surface with the sensor a plurality of times (eight times in the above-mentioned example) while feeding the recording material. Next, the surface is shot once in a state of stopping the shooting of the recording material, and shading data, which is the image reading noise obtained as above, is eliminated from the shot image. Thus, it is possible to obtain a more adequate surface image of the recording material.

The time period required for one imaging by the CMOS sensor is predetermined (or depends on the specification of the CMOS sensor), which is the time period for obtaining image data required for the determination of recording material. The imaging interval of the sensor unit 123 (time interval between multiple times of imaging) is set based on the time period required for one imaging.

Here, description will be made for the relation between the calculation of the above-described reading operation of the surface image and shading data and the feeding operation of recording material (see FIG. 1).

Paper supplied from the paper cassette 102 is fed to the feeding roller 124, and the surface image of the recording paper is read multiple times after a predetermined time period passed from the timing of the detection of the front edge of the paper by the top sensor 125. The predetermined time period is a time period required for reaching the position at which the paper can be imaged by the sensor unit 123, and is determined in advance based on the speed of the paper supply and the distance to the sensor unit 123.

The recording paper is being fed in the multiple reading operations. Shading data is calculated using the multiple read images. Then, the recording paper is temporally stopped, and the surface image of the recording paper is read again. A surface image of the recording paper is obtained from the image read by the reading operation and the shading data.

In the conventional image forming apparatus shown in FIG. 8, the feeding speed with which the feeding of the recording material is restarted is set at a normal speed that is determined in advance. The normal speed is an image forming speed with which an image is formed on plain paper.

As described above, the above process has the recording material 304 which is the recording medium fed to shoot the images for calibrating. In the case of feeding at normal speed, that is, the same feeding speed as when developing and fixing the images (i.e. forming an image) on the recording material 304 as with the conventional image forming apparatus shown in FIG. 8, the recording material 304 passes significantly below the sensor unit 123. For this reason, it is necessary for the image forming apparatus to incorporate an area large enough to hold the recording material 304 having passed behind the sensor unit 123 (a configuration for extending the feeding speed). Under normal conditions, a next feeding portion such as the transfer belt driving roller 104 is mounted behind the sensor unit 123 as shown in FIG. 1, and is adapted to perform a preprinting operation at a very close position to where the recording material 304 is supplied. For that reason, a sufficient distance is required between the sensor unit 123 and the transfer belt driving roller 104 for the recording material 304 to feed, decelerate and stop from the sensor unit 123 onward. Therefore, the conventional image forming apparatus could not avoid its housing from becoming large-size by any means since there is a substantial distance of the moving of the recording paper.

Figure 5:
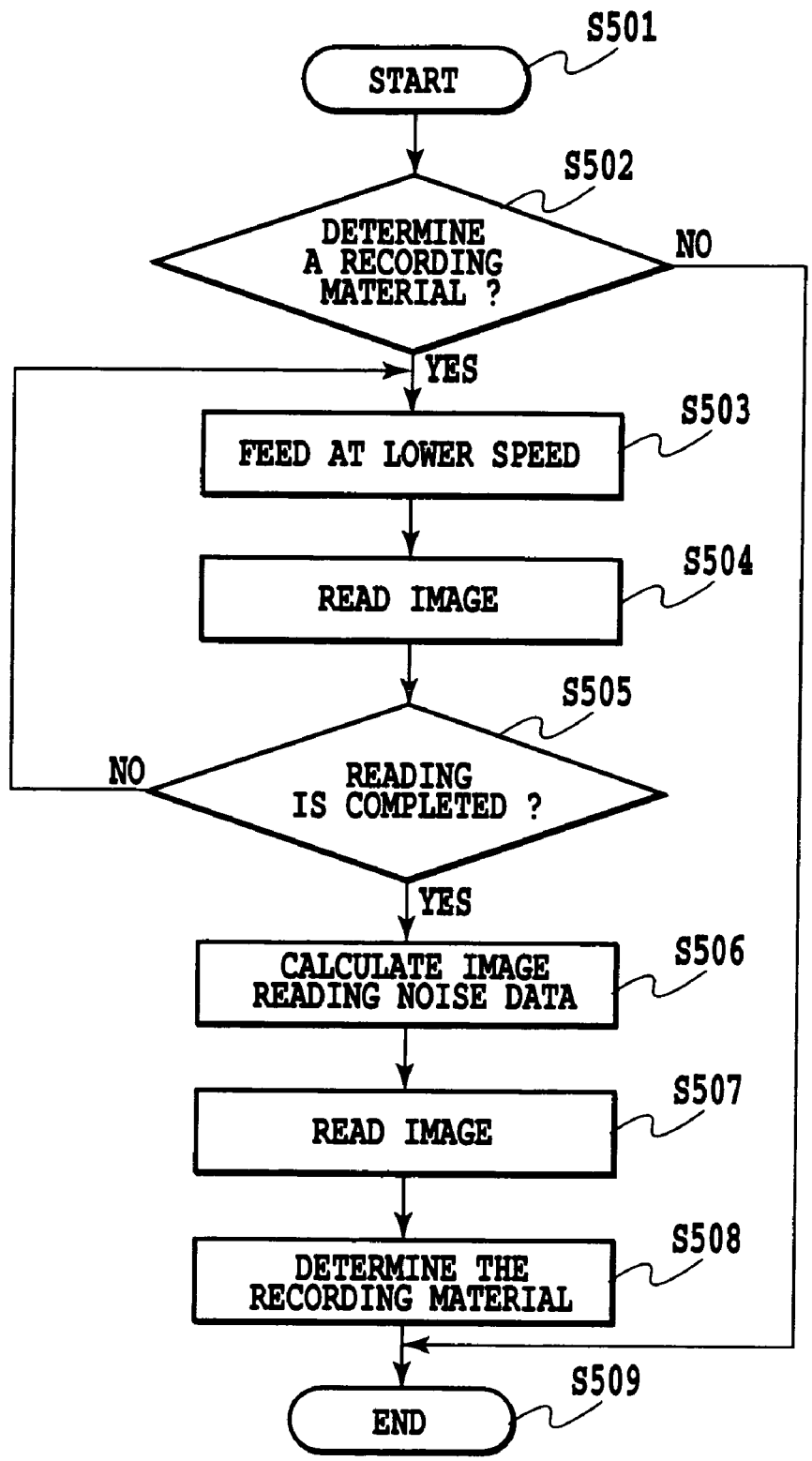
FIG. 5 is a flowchart showing operation of the control CPU according to an embodiment of the present invention.
Figure 11:
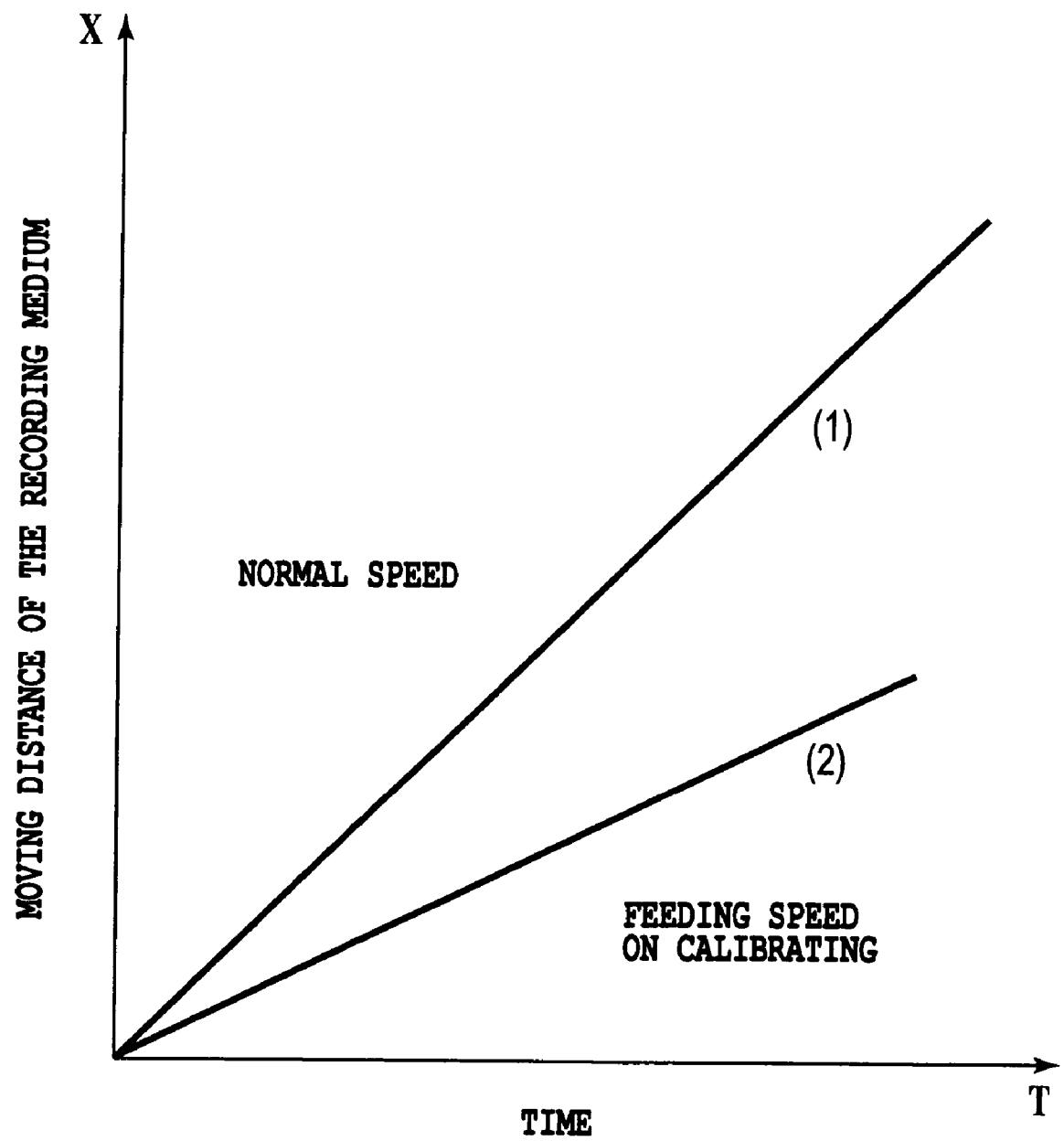
FIG. 11 is a diagram showing a difference between normal feeding and feeding of the sensor portion according to an embodiment of the present invention.

Thus, according to the present invention, it is possible to feed the recording material 304 at lower speed than normal speed on calibrating of the sensor unit 123 so as to reduce the distance by which the recording material 304 passes beyond the sensor unit 123. FIG. 9 shows the moving distance of the recording material is reduced relative to the case of FIG. 8 showing a feeding state of conventional art. FIG. 11 shows a moving distance of the recording medium as against the time then. FIG. 11 shows that the moving distance of the recording medium can be half by rendering the feeding speed on calibrating (2) half the normal speed (1). FIG. 5 is a flowchart showing the above operation. Each step will be described.

S501: Operation of determining recording material starts.
S502: It is determined whether determination of the recording material is to be performed.

Here, the process ends in the case where the user have decided in advance that the determination is unnecessary (NO).

S503: The recording material is fed at a speed lower than the speed in image forming that is set in advance for the recording material (normal speed).
S504: Reading of image is performed multiple times with the recording material being fed at a low speed.
S505: It is determined whether the reading is completed. Here, the process returns to S503 if the reading is not completed (NO).
S506: Image reading noise data (shading data) for eliminating radiation unevenness is calculated using multiple images read at S504.
S507: An image of the surface of the recording material is read with the moving of the recording material not performed.
S508: The recording material is determined using the image read at S506 and the image reading noise data calculated at S507.
S509: End of the determination operation.

Here, the control operation according to the flowchart in FIG. 5 is performed by the CPU 210.

As described above, it is possible, by rendering the speed of the recording medium slower than the normal speed on calibrating of the sensor, to reduce the distance from the sensor to the next feeding portion so as to provide the image forming apparatus of which apparatus proper is small. Further, it is possible to keep the accuracy in imaging of shading data so as to maintain the accuracy in the determination of the recording material.

According to this embodiment, the control is exerted to shoot the surface of the recording material once in the state of stopping the feeding of the recording material after shooting a plurality of times while moving the recording material. However, it is not limited thereto but it is also possible to shoot the surface of the recording material once in the state of stopping it first and then shoot a plurality of times while moving the recording material so as to eliminate the image reading noise (shading component).

Second Embodiment

Next, a second embodiment will be described. As its basic configuration and control are the same as that of the first embodiment, only the differences will be described by omitting detailed description of the configuration in common. As for the first embodiment, the configuration for reducing the feeding speed of the recording medium on calibrating of an imaging sensor (on measuring the shading data) was described. On an actual image forming apparatus, however, motor revolutions and a gear ratio are set to optimize a motor torque for the normal speed. Therefore, on switching to low speed, depending on the setting of the motor revolutions and gear ratio for the normal speed, the motor torque may become insufficient and cause revolution trouble. For this reason, there are the cases where stable feeding can no longer be secured if simply switched to the low speed.

The repeated operation of feeding and stopping according to the embodiment is controlled so that recording material is fed by repeating of feeding and stopping at S503 in the flowchart of FIG. 5.

Figure 12:
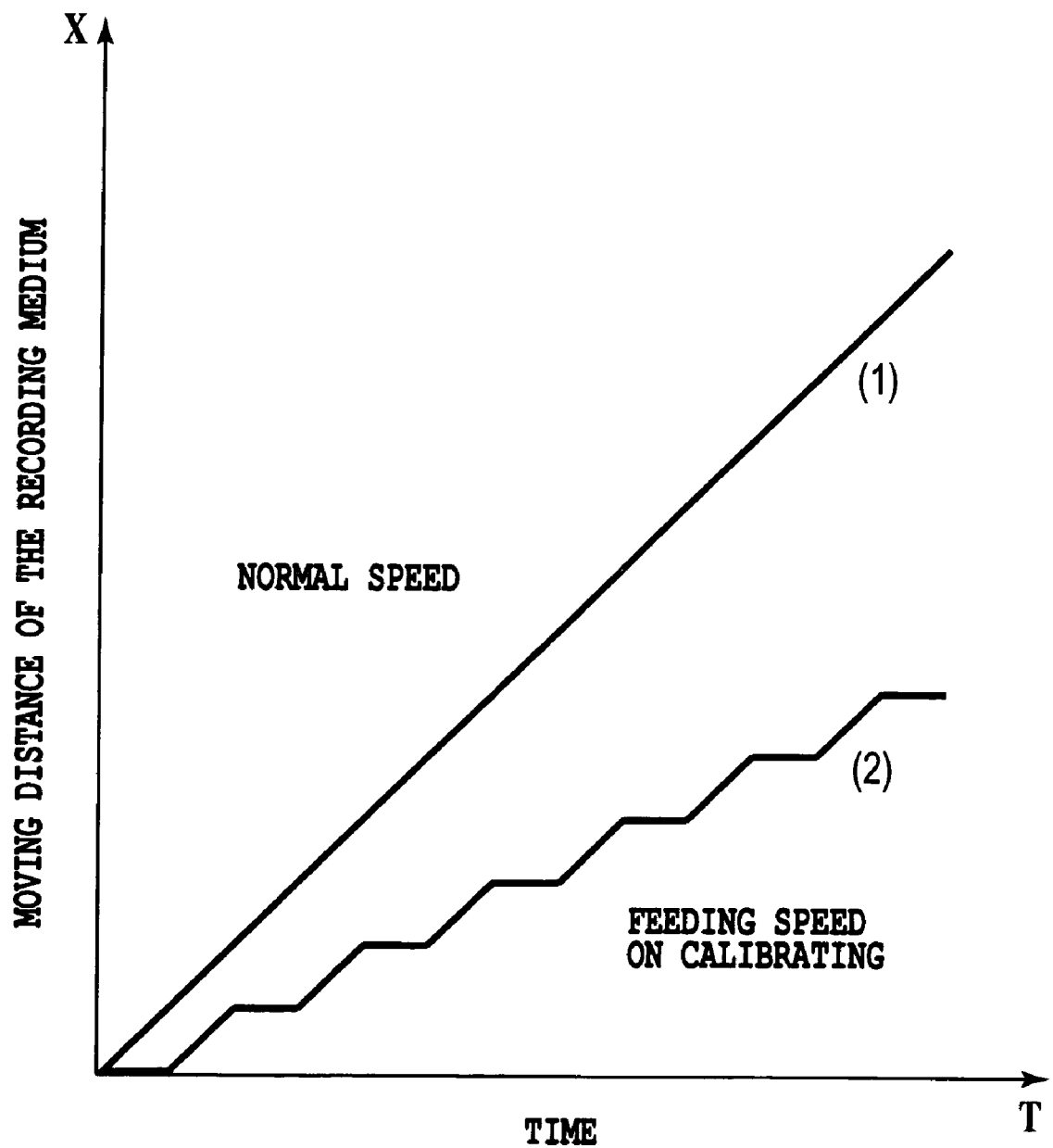
FIG. 12 is a diagram showing a difference between the normal feeding and the feeding of the sensor portion according to an embodiment of the present invention.

Thus, according to this embodiment, the control is exerted to repeat the feeding and stopping of the recording medium so as to reduce the moving distance of the recording medium. The moving distance of the recording medium versus time in this case is shown in FIG. 12. In FIG. 12, the feeding speed on moving (2) is equivalent speed to normal feeding speed (1), where a feeding distance of a moving medium is reduced by providing a stop time after moving for a predetermined time. According to this embodiment, the speed while moving is the same as the normal speed. However, this may also be different speed from the normal speed. To be more specific, without slowing down feeding operation causing unstableness, for example, the time period required for the determination of the recording material maybe reduced by increasing the feeding speed higher than the normal speed, or the speed may be any speed as long as the object of the present invention can be achieved.

As described above, it is possible to shoot the recording material 304 while moving and stopping it on calibrating of the sensor unit 123 and thereby render a moving distance of the recording medium shorter compared to the cases of feeding at the normal speed. Therefore, it is possible to reduce the distance from the sensor unit 123 to the next feeding portion so as to provide the image forming apparatus of which apparatus proper is small. Further, it is possible to keep the accuracy in imaging of shading data so as to maintain the accuracy in the determination of the recording material.

As for timing of shooting, it should be performed in predetermined and arbitrary timing (interval).

Third Embodiment

Next, a third embodiment will be described. As its basic configuration and control are the same as that of the first and second embodiments, only the differences will be described by omitting detailed description of the configuration in common. As for the second embodiment, the configuration for reducing the moving distance by repeating the moving and stopping of the recording medium was described. In this embodiment, the timing for moving and stopping the recording material 304 is synchronized with the timing for imaging of the sensor unit 123, thereby allowing an efficient calibration. Specifically, the recording medium is moved at the moment of the imaging to perform efficient calibrating.

Figure 13:
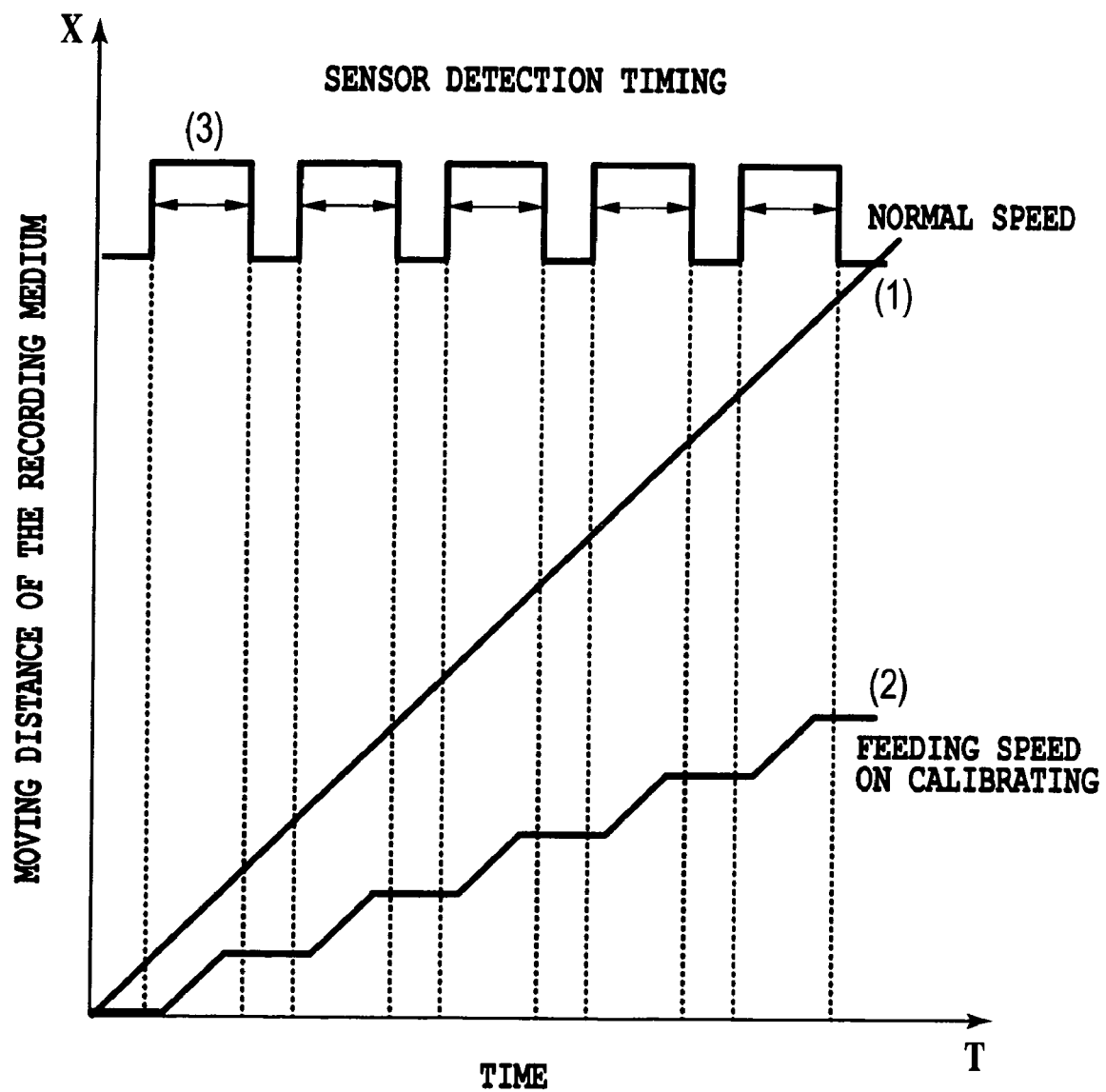
FIG. 13 is a diagram showing a difference between and timing of the normal feeding and the feeding of the sensor portion according to an embodiment of the present invention.

FIG. 13 shows the time in that case and the moving distance of the recording material 304. The sensor unit 123 repeatedly performs the imaging in fixed timing. The sensor unit 123 shoots the image of the recording material 304 in the area in which sensor detection timing (3) shown on top of FIG. 13 is High. To perform the calibrating of the sensor unit 123 without being influenced by a surface property of the recording material 304, the position of the imaging on the recording medium should be different between the imaging of last time and that of this time. It is also possible, if the recording medium is moving at the moment of the imaging, to perform the calibrating with less influence of the surface property of the recording medium. This is because the influence of the surface feature of the recording material is more reduced for the imaging in a static state than the imaging in a moving state, and therefore, shading data for compensating the variation in light amount due to the light source or lens is easily measured in the former case.

Thus, it is most efficient to move the recording medium by a requisite minimum distance once in timing for imaging of the sensor unit 123 and keep it suspended otherwise. As shown in FIG. 13, the recording medium repeatedly moves and stops like the feeding speed on calibrating (2) as against the timing of the sensor unit 123 shooting the image on the recording material 304 (3). In this case, the recording medium moves once per imaging. It thus stops after moving and shooting necessary number of times. It is thereby possible to render the moving distance of the recording medium minimal. Here, it shows an example in which the detection timing of the sensor unit 123 is not continuous but separate. However, the detection timing can be continuous. And it moves once per detection timing in the example in this embodiment. However, the shooting (detection) may be twice or more if the moving distance is slower than that of the normal speed.

As described above, the moving and stopping of the recording medium are synchronized with the detection timing of the sensor unit 123 on calibrating thereof (that is, on measuring of shading data) so that a substantial accuracy of the sensor calibration can be ensured thereby achieving an excellent accuracy of the determination of a recording media. Also, the moving distance of the recording material 304 becomes minimal and therefore, it is possible to reduce the distance from the sensor unit 123 to the next feeding portion so as to provide the image forming apparatus of which apparatus proper is small. It is also possible to secure sufficient accuracy of the calibrating of the sensor and accurately determine the recording medium. Therefore, it is possible to provide the image forming apparatus capable of setting optimal image forming conditions and forming high-accuracy images.

According to the present invention, the image forming apparatus comprises: feeding means for feeding the recording material at predetermined speed in a predetermined direction; image forming means for forming an image on the recording material fed by the feeding means; light irradiation means for irradiating light on the recording material; and image reading means for reading the light irradiated by the light irradiation means and reflected from the surface of the recording material and thereby obtaining the image on the surface of the recording material; and reflective type determination means, including the light irradiation means and the image reading means, for having the image on the surface of the recording material read by the image reading means a plurality of times so as to determine a predetermined attribute of the recording material by using a plurality of obtained images on the surface of the recording material, wherein the apparatus determines the kind of the recording material based on the attribute obtained by the reflective type determination means to form the image on the recording material, and the reflective type determination means includes feeding control means for, on having the recording material read by the image reading means, controlling the feeding means to render the moving distance shorter then than that in the case of feeding it at the predetermined speed. Therefore, it is possible to reduce the moving distance of the recording medium and thereby reduce the moving distance to be secured in the image forming apparatus so as to reduce the size of the apparatus by a simple method.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Applications Nos. 2004-101221 filed Mar. 30, 2004 and 2005-073784 filed Mar. 15, 2005, which are hereby incorporated by reference herein.

What is claimed is:

1. A recording medium determination apparatus comprising:
   an image reading portion for irradiating light on a recording medium and reading a plurality of surface images of the recording medium;
   a feeding portion for feeding the recording medium;
   a feeding control portion for controlling a feeding operation of the recording medium; and
   a determination portion for determining an attribute of the recording medium read by using a surface image of the recording medium read by the image reading portion,
   wherein the feeding control portion controls the feeding operation so as to repeat feeding and stopping of the recording medium and the determination portion calculates a shading data for determining the attribute of the recording material by using a plurality of the surface images of the recording medium read by the image reading portion, and
   wherein the image reading portion reads the plurality of surface images in the feeding of the repeat feeding and the stopping of the recording medium.

2. The recording medium determination apparatus according to claim 1, wherein the image reading portion reads light reflected from a surface image of the recording medium while the recording medium is fed.

3. The recording medium determination apparatus according to claim 1, wherein the plurality of surface images of the recording medium is obtained by reading the recording medium a plurality of times with the image reading portion.

4. An image forming apparatus comprising:
   a feeding portion for feeding a recording medium;
   an image forming portion for forming an image on the recording medium fed by the feeding portion;
   a image reading portion for irradiating light on a recording medium and reading light reflected from a surface of the recording medium and thereby obtaining a surface image of the recording medium;

a control portion for setting an image forming condition of the image forming portion by using a plurality of surface images of the recording medium read by the image reading portion,
wherein the image reading portion reads a plurality of surface images of the recording medium, which repeats feeding and stopping. and the control portion calculates a shading data for determining the attribute of the recording medium by using the plurality of the surface images of the recording medium read by the image reading portion, and
wherein the image reading portion reads the plurality of surface images in the feeding of the repeat feeding and the stopping.

* * * * *